Patented July 29, 1930

1,771,767

UNITED STATES PATENT OFFICE

GÉRALD BONHÔTE, OF MONTANA, SWITZERLAND, ASSIGNOR TO SOCIETY OF CHEMICAL INDUSTRY IN BASLE, OF BASEL, SWITZERLAND

AZO DYESTUFFS OF THE PYRAZOLONE SERIES AND PROCESS OF MAKING SAME

No Drawing. Application filed November 20, 1928, Serial No. 320,751, and in Switzerland November 24, 1927.

The present invention relates to new azo dyestuffs of the pyrazolone series especially suitable for the dyeing of wool and silk. It comprises the process of making these products, the new products themselves and the material dyed therewith.

It has been found that new dyestuffs, which combine a good fastness to alkali, to washing and to acid fulling with an excellent fastness to light and an exceedingly good levelling power, are obtained by coupling diazotized dichloranilines, such as for instance 2:4- or 2:5-dichloraniline, with such 1-aryl-3-methyl-5-pyrazolone-sulfonic acids the aryl nucleus of which contains besides the sulfo-group no other substituents than at least one halogen, as for example the 3-methyl-5-pyrazolones deriving from the mono- or polyhalogen-anilinesulfonic acids, (such for example as 4-chloro-1-aniline-3-sulfonic acid or 2:5-dichloro-1-aniline-4-sulfonic acid), the chlorotoluidinesulfonic acids, and so on. The new dyestuffs, corresponding to the general formula—

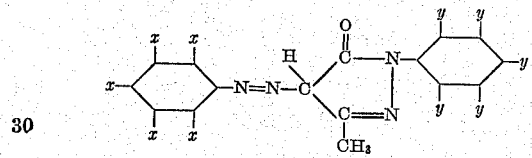

wherein $x$ is in two cases chlorine and in the three other hydrogen, $y$ in one case an $SO_3H$-group, at least in one further case chlorine, and the rest, being neither $SO_3H$ nor chlorine, hydrogen, form yellow powders dissolving in water with a yellow coloration, and dyeing wool and silk from an acid bath yellow tints which possess the above mentioned valuable properties. The new dyestuffs may also be converted into insoluble metal salts and can be used for making lacquers.

The following example illustrates the invention, the parts being by weight:—

16.2 parts of 2:5-dichloraniline are diazotized in the usual manner. The diazo-solution is coupled at 5–10° C. with a solution of 28.8 parts of 1-(2-chloro-5-sulfo)-phenyl-3-methyl-5-pyrazolone containing sodium carbonate in excess. The coupling sets in at once. The solution is stirred until the diazo-compound has disappeared, the precipitated dyestuff is filtered and dried. It forms a yellow powder dissolving in water with a yellow coloration, and dyeing wool and silk from an acid bath yellow tints which possess the valuable properties already above mentioned. The new dyestuff may also be converted into insoluble metal salts and can be used for making lacquers.

What I claim is:—

1. Process for the manufacture of new azo-dyestuffs corresponding to the general formula—

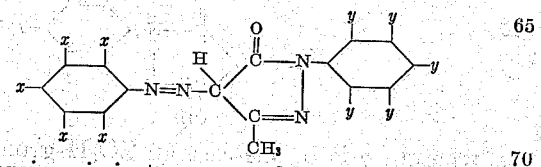

wherein $x$ is in two cases chlorine and in the three other hydrogen, $y$ in one case an $SO_3H$-group, at least in one further case chlorine, and the rest, being neither $SO_3H$ nor chlorine, hydrogen, by coupling diazotized dichloranilines with such 1-aryl-3-methyl-5-pyrazolone-sulfonic acids the aryl nucleus of which contains besides the sulfo-group no other substituents than at least one halogen atom.

2. Process for the manufacture of new azo-dyestuffs corresponding to the general formula—

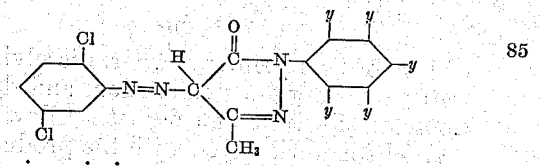

wherein $y$ is in one case an $SO_3H$-group, at least in one further case chlorine, and the rest, being neither SO₃H nor chlorine, hydrogen, by coupling diazotized 2:5-dichloraniline with such 1-phenyl-3-methyl-5-pyrazolone-sulfonic acids the benzene nucleus of which contains besides the sulfo-group no other substituents than at least one halogen atom.

3. Process for the manufacture of the new azo-dyestuff corresponding to the formula—

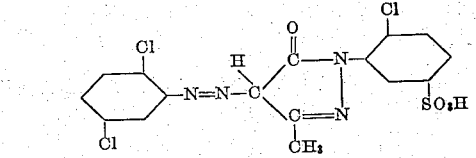

by coupling diazotized 2:5-dichloraniline with 1-(2-chloro-5-sulfo-)-phenyl-3-methyl-5-pyrazolone.

4. As new products the azo-dyestuffs of the general formula—

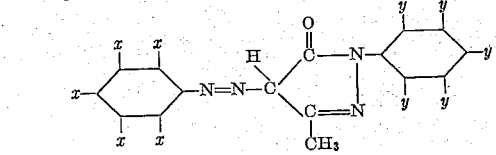

wherein $x$ is in two cases chlorine and in the three other hydrogen, $y$ in one case an SO₃H-group, at least in one further case chlorine, and the rest, being neither SO₃H nor chlorine, hydrogen, which dyestuffs form yellow powders, dissolving in water with a yellow coloration, and dyeing wool and silk from an acid bath yellow tints.

5. As new products the azo-dyestuffs of the general formula— wherein $y$ is in one case an SO₃H-group, at least in one further case chlorine, and the rest, being neither SO₃H nor chlorine, hydrogen, which dyestuffs form yellow powders, dissolving in water with a yellow coloration, and dyeing wool and silk from an acid bath yellow tints.

6. As a new product the azo-dyestuff of the formula— which forms a yellow powder, dissolving in water with a yellow coloration, and dyeing wool and silk from an acid bath yellow tints.

7. The material dyed with the products of claim 4.

8. The material dyed with the products of claim 5.

9. The material dyed with the product of claim 6.

In witness whereof I have hereunto signed my name this 3rd day of November, 1928.

GÉRALD BONHÔTE.